(12) United States Patent
Christianson

(10) Patent No.: US 8,621,728 B2
(45) Date of Patent: Jan. 7, 2014

(54) LOCKING CARABINER

(76) Inventor: Tony Christianson, Yosemite, CA (US)

( * ) Notice: Subject to any disclaimer, the term of this patent is extended or adjusted under 35 U.S.C. 154(b) by 0 days.

(21) Appl. No.: 13/569,201

(22) Filed: Aug. 8, 2012

(65) Prior Publication Data

US 2013/0036579 A1    Feb. 14, 2013

Related U.S. Application Data

(60) Provisional application No. 61/574,825, filed on Aug. 9, 2011, provisional application No. 61/685,376, filed on Mar. 16, 2012.

(51) Int. Cl.
*F16B 45/02* (2006.01)
*A44B 13/02* (2006.01)

(52) U.S. Cl.
USPC ....... 24/600.1; 24/599.5; 24/599.7; 294/82.2; 294/82.23

(58) Field of Classification Search
USPC ............ 24/599.1, 599.9, 600.1, 599.5, 599.6, 24/599.7, 598.1; 294/82.19, 82.2, 82.33
See application file for complete search history.

(56) References Cited

U.S. PATENT DOCUMENTS

| 8,117,721 | B2* | 2/2012 | Yang | 24/599.5 |
| 2003/0105190 | A1* | 6/2003 | Diehl et al. | 523/201 |
| 2004/0143945 | A1* | 7/2004 | Christianson | 24/600.1 |
| 2008/0005876 | A1* | 1/2008 | Christianson | 24/600.1 |
| 2012/0102688 | A1* | 5/2012 | Yang | 24/600.1 |
| 2013/0025095 | A1* | 1/2013 | Yang | 24/599.5 |

* cited by examiner

*Primary Examiner* — Robert J Sandy
*Assistant Examiner* — Michael Lee

(57) ABSTRACT

A locking carabiner having an eccentric pivot that when rotated causes a reciprocating motion that moves the opening end of the gate into or out of locking engagement with the carabiner body. Rotation of the eccentric is controlled by a short lever that can be easily moved by a fingertip, consequently the gate can be conveniently manipulated and locked with the fingers of one hand. The locking mechanism adds negligible weight and bulk to the carabiner. The locking mechanism can be incorporated on bent gate, straight gate and wire gate carabiners.

13 Claims, 7 Drawing Sheets

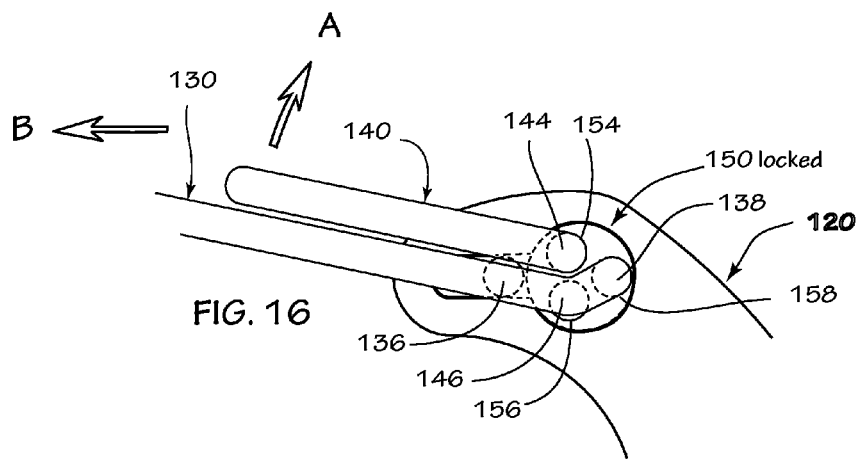
FIG. 16
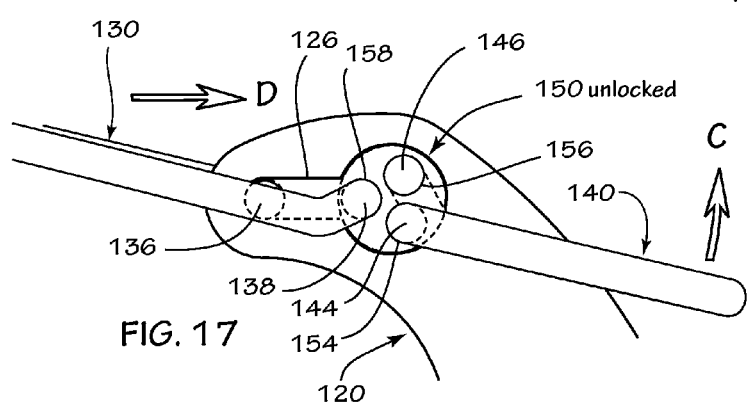
FIG. 17
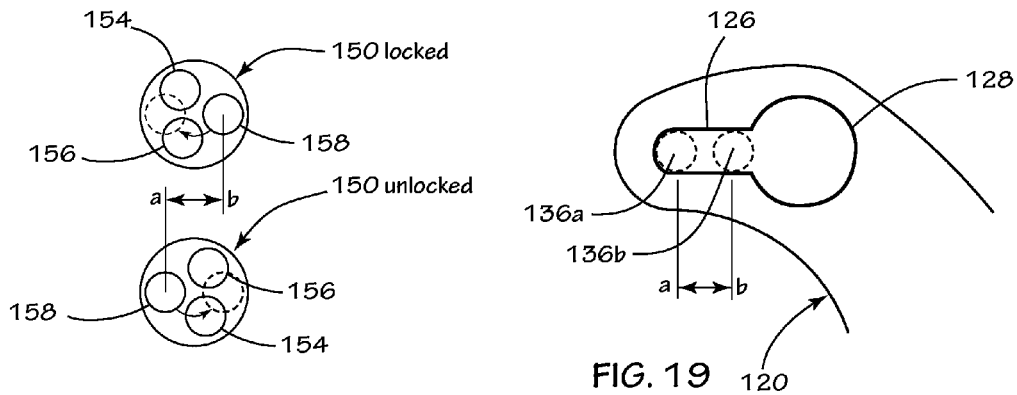
FIG. 18
FIG. 19

LOCKING CARABINER

CROSS-REFERENCE TO RELATED APPLICATIONS

The instant invention is related to Provisional Application No. 61/574,825 entitled "Cam Lock Carabiner," filed Aug. 9, 2011, and Provisional Application No. 61/685,376 entitled "Locking Wiregate Carabiner" filed Mar. 16, 2012, the disclosures of which are incorporated herein by reference.

BACKGROUND OF THE INVENTION

1. Field of the Invention

The instant invention is generally related to climbing aids for rock climbers. More particularly, this invention is related to carabiners that link climbing aids together.

2. Description of the Prior Art

Climbers utilize rope, slings and a variety of mechanical devices as climbing aids to assist and protect their movement over rock. The climbing aids serve as a means to anchor the climber to the rock for the purpose of either preventing or arresting a fall.

A carabiner is a mechanical device used to link rope, slings and other climbing aids together. A carabiner is essentially a device used, for example, to attach a climber's body harness to the climbing rope. It is also used to link the climbing rope to anchors placed in or over the rock.

During a climb and especially in the event of a fall, the climber's safety is dependent on the security of numerous carabiner links. Consequently, it is imperative that every carabiner in the chain be able to withstand not only the weight of the climber but also the inertial forces generated when the rope arrests a fall.

A typical carabiner is palm sized, and either an oblong, oval or "D" shaped ring of a lightweight, high strength material, usually a heat-treated aluminum alloy. One side of the carabiner has a hinged arm that serves as an inward opening gate. The gate is spring loaded to remain normally closed. The normally closed, inward opening gate facilitates insertion of climbing aids such as rope or slings, but impedes inadvertent removal. Climbing aids are released from the carabiner by manually opening the gate.

There are two types of carabiner gates, wire gates and solid gates. A wire gate is a simple loop of corrosion-resistant spring-wire bent in a the shape of an elongated "U". A solid gate is a short bar of a rigid high strength material, usually a heat-treated aluminum alloy.

The wire loop itself provides the closing force for a wire gate. This is accomplished by bending the legs of the "U" slightly off-parallel with unequal lengths, and bending the staggered ends 90-degrees inward. The wire loop must be slightly twisted for the ends to pass through correspondingly offset holes in the body of the carabiner. Twisting the wire loop causes a cantilevered spring force that holds the gate normally closed. Opening the wire gate additionally twists the wire which increases the spring force working to close the gate.

The closing force of a solid gate is provided by a stout compression spring that is housed within the gate. The spring axis is offset from a pivot pin so that the spring force is directed to close the gate. A spring link is employed to transfer the spring force to the carabiner body at an appropriate distance from the pivot pin. Opening the solid gate compresses the spring.

The opening end of the carabiner gate incorporates an interlocking mechanism that engages the carabiner body when the gate is closed. For wire gates the interlock is provided by the wire's looped nose mating with a hooked notch on the carabiner body. For solid gates the interlocking mechanism is typically a transverse pin that mates with a hooked notch on the carabiner body. Another popular configuration for solid gates is a keyed arrangement that mates a bulbous nose of the gate's opening end with a correspondingly shaped recess in the carabiner body. These interlocking arrangements allow a closed gate to carry part of the load imposed on the carabiner. Consequently, the carabiner is significantly stronger when the gate is closed. The ultimate strength of a carabiner with the gate open is typically 65% lower than with the gate closed.

Wire gate carabiners have several advantages over those with a rigid gate . Wire gate carabiners typically weigh less than rigid gate carabiners. Furthermore, a wire gate consists of only one working part, whereas a rigid gate is an assembly of at least four (4) parts: bar, spring, spring link, and pivot pin. The inherent simplicity of the wire gate makes it more reliable and less prone to problems of breakage, contamination or icing.

As the climber progresses upward, the carabiners in a protective chain of climbing aids often rub against the rock. Occasionally, a carabiner gate will catch on a rock or other object, or the rope itself, and may be temporarily pushed or pulled open without the climber's knowledge. Additionally, a carabiner can slap against the rock during a fall causing inertial loads that overcome the closing force of the spring and momentarily open the gate. Also, a rope moving rapidly through a carabiner during a fall can cause the carabiner body to vibrate sufficiently to shake the gate open.

Whenever the gate is opened, even momentarily, there is significant risk that a rope or other attached climbing aid will be inadvertently released. Furthermore, if a sudden load is applied to the carabiner at the instant that the gate is open, the ultimate strength of the carabiner will be significantly compromised and possibly fail. Such occurrences are well known by the climbing community and are considered a significant problem. Consequently, climbers pay careful attention to the placement and orientation of carabiners in order to minimize the chance of an inadvertent opening of the gate.

Climbers often use two carabiners joined by a short length of looped webbing, a combination called a quickdraw. One of the quickdraw carabiners is clipped to an anchor placed in or on the rock. The other quickdraw carabiner is clipped to the climber's rope. The quickdraw allows the rope to pull toward the centerline between staggered anchors thereby providing a less resistive path from the belay point to the climber.

A quickdraw requires the use of two carabiners to attach a rope to a single anchor. Assembling a quickdraw with smaller, lightweight carabiners minimizes the weight and bulk penalty of using two carabiners. Wire gate carabiners are often used for quickdraw configurations because they weigh less than solid gate carabiners.

A properly placed quickdraw may have the additional benefit of reducing the chance of an inadvertent opening of the gate. Unfortunately this is often not the case. For example, if the rope is incorrectly threaded through the carabiner, a moving rope can twist the carabiner and expose the gate to a sideward opening force. Also, if the rope is pulled across or around the gate, the gate can be inadvertently opened.

A climber must be very careful when placing and clipping into a quickdraw. The dangling carabiner (the carabiner that will be clipped to the climbers rope) must be oriented so that its gate is away from the rock face. When the rope is clipped in, it must run along the spine of the carabiner, not across the gate.

Many solid gate carabiners have a bend to facilitate clipping the rope. The bent gate's center is curved inward slightly which allows the gate to open wider and serves to guide the rope to the opening end. Bent gate carabiners are often used as the dangling carabiner of quickdraw configurations.

Placing the rope into the quickdraw's dangling carabiner requires skill and dexterity. Usually the climber is hanging on to the rock surface with one hand, and has only one hand free to clip in the rope. Depending on which hand is free, and the location and orientation of the carabiner relative to the climber, a variation of two techniques is typically used: 1. The carabiner is stabilized with the middle finger, and the rope is clipped in with the thumb and index fingers; or 2. Stabilize the carabiner with the thumb, and clip the rope using the index and middle fingers. No matter the technique used, the carabiner gate must open easily and without hesitation.

There are situations where the risk of an inadvertent opening of the gate is totally unacceptable, For example, the carabiner used to attach the climbing rope to the climber's body harness must never open inadvertently. Similarly, the carabiner used to attach a belay device to the climber's harness must never open inadvertently. Consequently, harness attachments and the like require greater security, for example, two parallel carabiners or a single carabiner with a locking gate.

Greater security can be obtained by using two carabiners side-by-side with the gates opening in opposite directions. However, extra carabiners solely for the purpose of parallel placement are undesirable because they double the weight and bulk that the climber must carry.

To avoid the need for side-by-side carabiners, various mechanical means have been developed to lock solid gates closed. For example, a popular locking configuration incorporates a sleeve that is threaded, nut like, to the gate. The sleeve can be screwed along the length of the gate, either toward the hinge, or toward the opening end. The sleeve is screwed into the locking position after the rope or other climbing aids have been clipped into the carabiner and the gate closed. In one configuration the gate is locked by screwing the sleeve until it crosses the opening end of the gate and moves over or jams against the adjacent body of the carabiner. In an alternate configuration the gate is immobilized when the sleeve is screwed over the hinge. Locking or unlocking a carabiner with a threaded sleeve is not instantaneous, that is, it takes time to thread the sleeve from the unlocked position to the locked position and the reverse.

Threaded locking sleeves undesirably add bulk and weight to the carabiner. Threaded locking sleeves are also inherently troublesome. The threads can become clogged with dirt or ice. The sleeve can inadvertently screw out of the locked position when the carabiner rubs across the rock. Furthermore, the gate and threaded sleeve mechanism require precise machining and assembly alignment, both of which add to manufacturing cost.

Other solutions of the prior art include solid gates equipped with spring loaded sliding and/or rotary sleeves called auto-lockers. Sliding and/or rotary sleeves function similarly to threaded sleeves, and are designed to lock automatically and nearly instantaneously when the gate closes. Sliding and rotary sleeves share the same problems as threaded sleeves, and are especially costly to manufacture. A critical problem of auto-lockers is that the gate can jam and not correctly close.

The increased bulk, weight and expense of the prior art limits the number of locking carabiners that a climber carries during a climb or is willing to buy. Consequently, there may be situations during a climb when the climber is compelled to use a non-locking carabiner although a locking type would be preferable or safer.

The security of quickdraw applications would benefit from the use of locking carabiners, but most quickdraw configurations utilize at least one wire gate or bent gate carabiner. Due to its wire construction, threaded or sliding/rotary sleeves cannot be incorporated on wire gate carabiners. And the bend interferes with mounting locking sleeves on bent gates. The prior art only has the means to lock a straight gate closed.

Quickdraw configurations do not incorporate state-of-the-art locking straight gate carabiners because they are considered too heavy and bulky for this application. The need to be able to easily and instantly clip a rope using only one hand make auto-locking gates especially inappropriate for quickdraw use.

The instant invention is a locking means ideally suited for quickdraw applications because it adds negligible weight and bulk to the carabiner and can be incorporated on bent gate, straight gate and wire gate configurations. The instant invention is a locking mechanism that can securely, reliably and quickly lock a carabiner gate by flipping a short lever with a fingertip. Furthermore, compared to state-of-the-art locking means, the instant invention is less susceptible to jamming and is easily manufactured.

SUMMARY OF THE INVENTION

The instant invention has an eccentric pivot that when rotated causes a reciprocating motion that moves the opening end of the gate into or out of locking engagement with the carabiner body. Rotation of the eccentric is controlled by a short lever that can be easily moved by a fingertip, consequently the gate can be conveniently manipulated and locked with the fingers of one hand. The locking mechanism adds negligible weight and bulk to the carabiner. The inventive locking mechanism can be incorporated on bent gate, straight gate and wire gate carabiners.

DESCRIPTION OF THE DRAWINGS

A detailed description of the invention is made with reference to the accompanying drawings wherein like numerals designate corresponding parts in the several FIGS.

FIG. 16 is a partial close-up side view of the locked carabiner of FIG. 13 viewed at the approximate location and in the direction 4-4 of FIG. 3

FIG. 17 is a partial close-up side view of the unlocked carabiner of FIG. 13 viewed at the approximate location and in the direction 4-4 of FIG. 3.

FIG. 18 is a side view showing a comparison of the wire gate locking eccentric in both the locked and unlocked positions.

FIG. 19 is a partial close-up side view of the wire gate carabiner body viewed in the approximate location and direction 4-4 of FIG. 3.

DESCRIPTION OF THE PREFERRED EMBODIMENT

The following detailed description is of the best presently contemplated modes of carrying out the invention. This description is not to be taken in a limiting sense, but is made merely for purposes of illustrating the general principles of the invention.

FIGS. 2-12 show the invention applied to solid gate carabiners. FIGS. 13-19 show the invention applied to wire gate carabiners.

Figure 1:
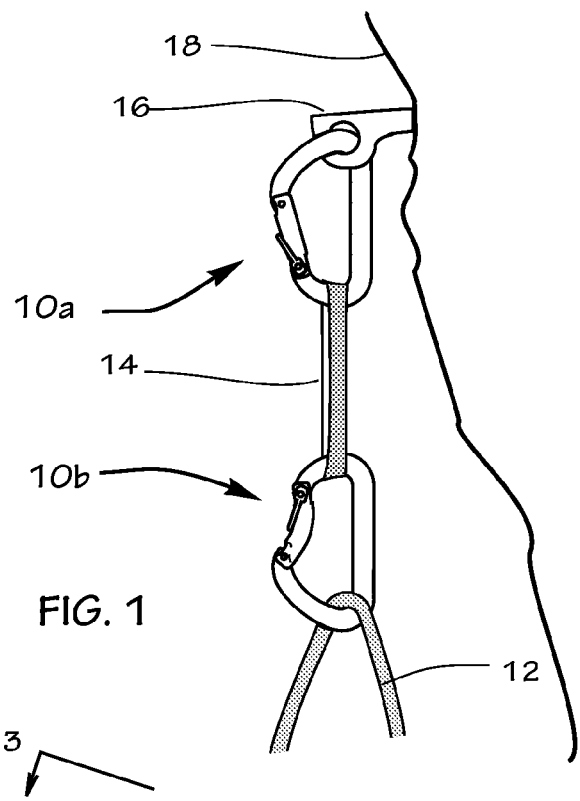
FIG. 1 is a pictorial view of a quickdraw configuration featuring inventive straight and bent gate carabiners linking rope with an anchor.

Referring to FIG. 1, carabiners 10a and 10b, both incorporating the inventive locking mechanism, are shown linked by looped webbing 14 to form a quickdraw configuration. Carabiner 10a has a straight gate and is clipped to piton 16, which is anchored to a crack in rock wall 18. Carabiner 10b has a bent gate and is clipped to climbing rope 12. Piton 16 is representative of one of many types of anchors used by climbers. FIG. 1 exemplifies one of the many ways that carabiners are used to link climbing aids together.

Figure 2:
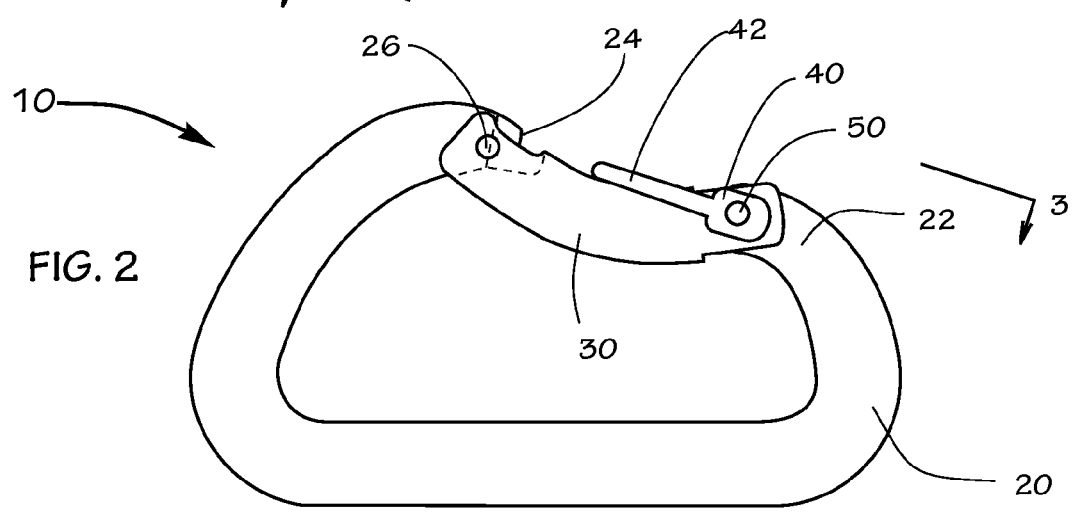
FIG. 2 is a side elevation view of a bent gate carabiner incorporating the inventive locking mechanism. The inventive carabiner is pictured locked.

Referring to FIG. 2, solid gate carabiner 10 includes body 20, gate 30, and eccentric 40. Body 20 and gate 30 are typically fabricated from a lightweight, high strength material, for example aluminum alloy type 7075 heat treated to condition T6.

The preferred configuration of the inventive locking mechanism for solid gate carabiners is illustrated by FIGS. 2-10. The terms "top" and "bottom"; "above" and "below"; "right" and "left" refer to the orientation of carabiner 10 shown by FIG. 2. Although FIGS. 2-10 feature the inventive locking mechanism on a bent gate carabiner, the inventive locking mechanism can be incorporated on straight gate carabiners as well.

Figure 3:
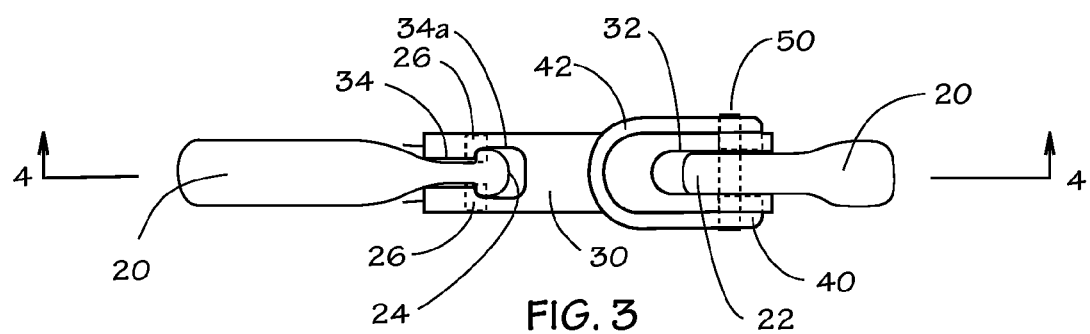
FIG. 3 is a top view of the carabiner as seen in the direction 3-3 of FIG. 2.

Referring to FIG. 3, gate 30 is slotted at both ends by slots 32 and 34. Leg end 22 of body 20 nests loosely within the confines of slot 32. Gate 30 is hinged to body 20 through eccentric 40 by pin 50 (see FIG. 5). Pin 50 passes through hole 28 in leg end 22 with clearance sufficient to allow easy rotational movement. Pin 50 is typically steel and peened at both ends to secure it in place.

Figure 4:
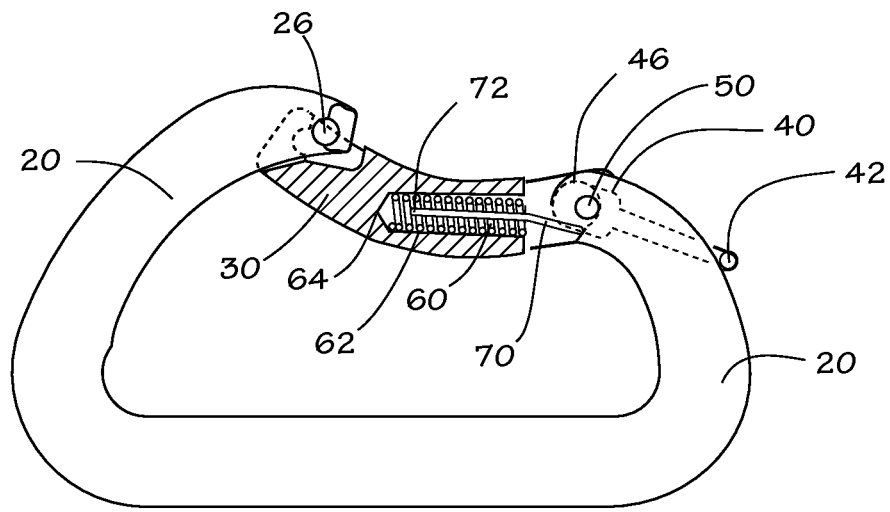
FIG. 4 is a partial sectional view of the inventive carabiner showing the gate unlocked, taken along a cut corresponding to line 4-4 of FIG. 3.
Figure 5:
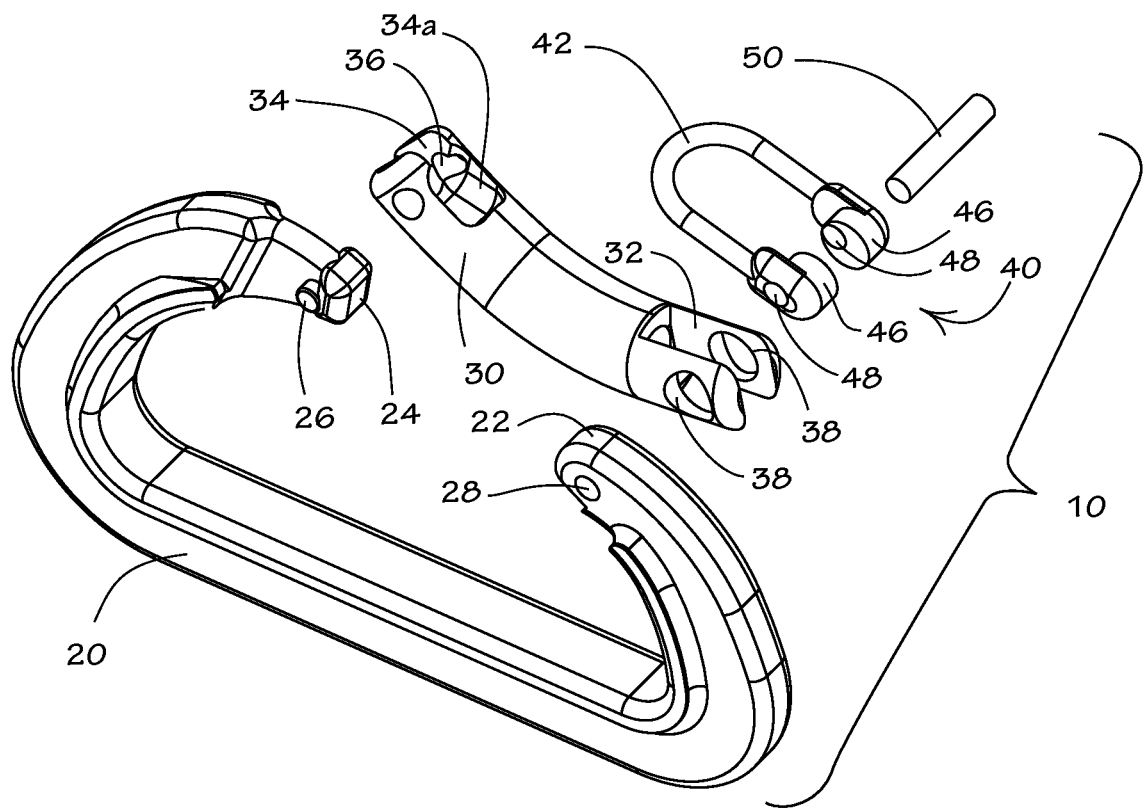
FIG. 5 is an exploded wireframe isometric drawing showing the main components of the inventive locking solid gate carabiner.

Referring to FIG. 4, gate 30 is urged to the closed position by the combined action of compression spring 60 and spring link 70. Compression spring 60 and part of spring link 70 are loosely contained within blind hole 62 that opens into slot 32. One end of compression spring 60 rests against hole bottom 64, the other end of the spring engages a notch (not shown) on spring link 70 so that movement of spring link 70 toward hole 62 causes spring 60 to be correspondingly compressed. Compression spring 60 is typically fabricated by coiling a corrosion resistant material, for example 17-7 PH stainless steel spring wire. Spring link 70 is fabricated by stamping stainless steel sheet or molding plastic or the like.

Figure 8:
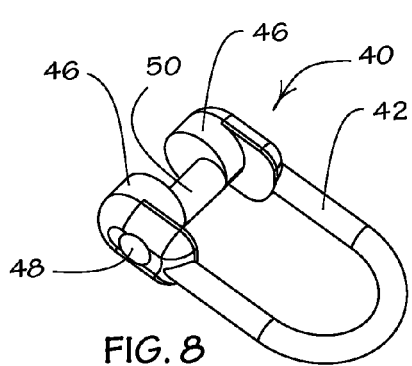
FIG. 8 is a wireframe isometric drawing of the eccentric pivot of the inventive carabiner viewed in the approximate direction 8-8 of FIG. 6.
Figure 9:
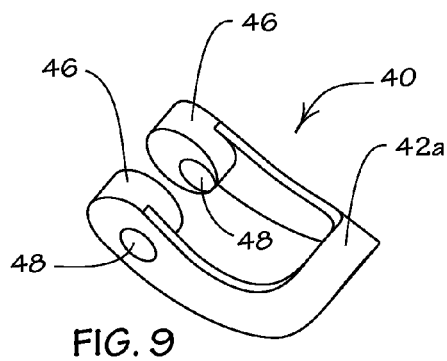
FIG. 9 is a wireframe isometric drawing of an alternative eccentric pivot of the inventive carabiner viewed in the approximate direction 8-8 of FIG. 6.
Figure 10:
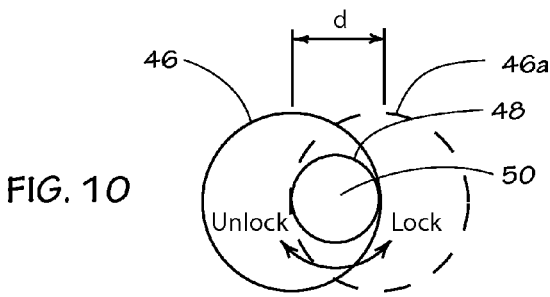
FIG. 10 is a diagram of the eccentric mechanism.

Referring to FIGS. 8 and 9, and the diagram of FIG. 10, eccentric 40 has outer cylindrical surfaces 46 and inner cylindrical surfaces 48. The diameter of cylindrical surface 46 is approximately double the diameter of cylindrical surface 48. Cylindrical surface 48 is a hole that snugly holds pin 50. The central axis of surface 48 is offset from the central axis of surface 46 so that the surface of cylinder 48 coincides approximately with the center of cylindrical surface 46. Cylindrical surfaces 46 and 48 have a central gap to enable insertion of body leg end 22.

Pin 50 passes through hole 48 (of eccentric 40) and hole 28 (of body leg end 22). Cylindrical surface 46 passes through hole 38 in the hinged end of gate 30 (best seen in FIG. 5) with clearance to allow easy rotational movement of gate 30. The arrangement of the eccentric surfaces can be reversed without affecting the functional operation of the inventive locking mechanism. That is, cylindrical surface 46 can pass through an appropriately sized hole in body leg end 22, and pin 50 through an appropriately sized hole in the hinged end of gate 30. For example, the inventive locking wire gate carabiner of FIGS. 13-19 features eccentric 150 mounted in hole 128 of carabiner body 120 with gate 130 pinned to offset hole 158 in eccentric 150.

Relative to body 20, an approximately 180-degree rotation of eccentric 40 around pin 50 causes a reciprocating motion that moves the center of surface 46 the distance labeled "d" in FIG. 10. The distance "d" is approximately equal to the diameter of pin 50, typically ⅛-inch. FIG. 10 depicts cylindrical surface 46 in the unlocked position as a solid circle. Cylindrical surface 46 is depicted in the locked position as a dashed-line. The arced line with an arrow at each end and the captions "lock" and "unlock" show the direction of rotation of the eccentric to either lock or unlock gate 30.

Control arm 42 provides controlled rotational movement of eccentric 40 and thereby movement of cylindrical surface 46 around pin 50. Control arm 42 is pictured in FIG. 8 as being formed by bending wire into a "U" shape that is attached to eccentric surfaces 46. Other configurations of control arm 42 accomplish the same function, for example the arm can be a curved wire that partially wraps around the gate, or the arm can stamped from sheet-metal or forged as a single piece or molded or the like. Ideally, the size and shape of control arm 42 is chosen for compactness and convenience of motion. The alternate control arm configuration of FIG. 9 shows control arm 42a formed by stamping sheet-metal, or the like, and folded to fit snugly around the exterior of gate 30 when locked, advantageously minimizing the overall width of the assembly.

Figure 6:
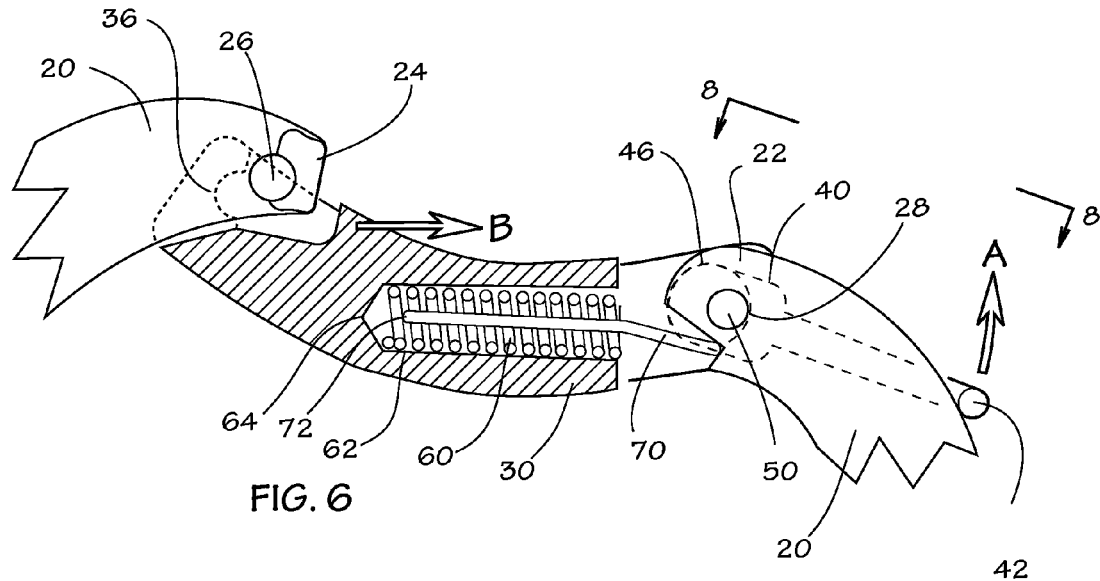
FIG. 6 is a partial close-up sectional view of the carabiner of FIG. 4 showing the gate unlocked.
Figure 7:
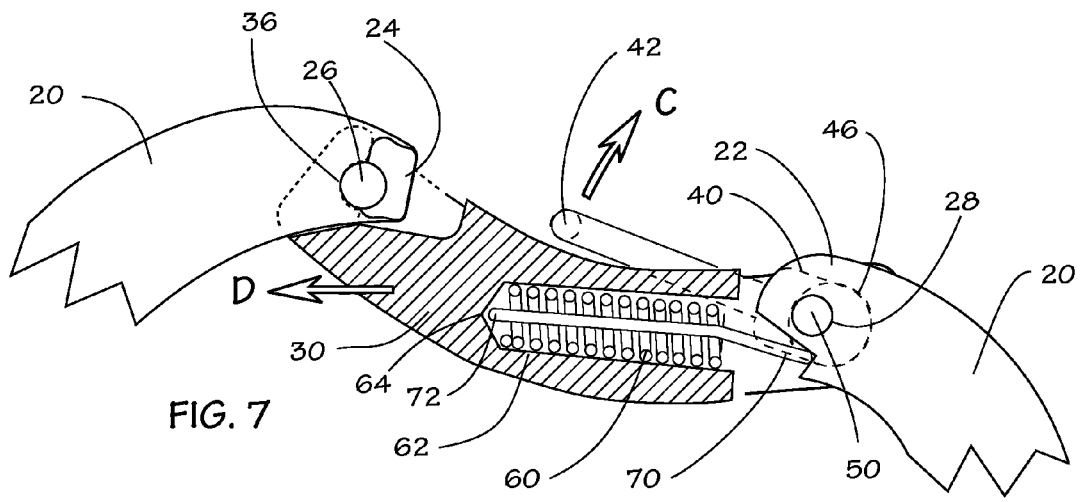
FIG. 7 is a partial close-up sectional view of the carabiner of FIG. 4 showing the gate locked.

Movement of control arm 42 with subsequent movement of eccentric 40 over an approximately 180-degree arc causes gate 30 to move right or left as depicted by the outline arrows "B" and "D" in FIGS. 6 and 7 respectively. For example, when control arm 42 is moved in the arc direction depicted by the outline arrow "A" in FIG. 6, gate 30 will move the distance "d" to the right as depicted by outline arrow "B". Similarly, when control arm 42 is moved in the arc direction depicted by the outline arrow "C" in FIG. 7, gate 30 will move the distance "d" to the left as depicted by outline arrow "D".

The carabiner pictured in FIGS. 2-7 features a keyed arrangement to interlock the opening end of gate 30 to leg end 24 of body 20. Slot 34 is machined or formed wider at 34a to interlockingly and loosely engage the corresponding bulbous leg end 24 (best seen in FIG. 5). When the gate is closed, the interlocking relationship serves to solidly join the gate opening end and body 20 when high tensile loads stretch and deform the body, thereby causing closed gate 30 to carry part of the load transmitted through body 20. Consequently, the carabiner is strongest when the gate is closed, either locked or unlocked.

Although not strictly necessary, for additional security, included with the bulbous leg end 24 is secondary protrusion 26. A matching undercut 36 is provided in the keyed slot portion 34a of gate 30 to mate with protrusion 26. As seen in FIG. 6, when gate 30 is unlocked, protrusion 26 does not engage undercut 36 and the resultant clearance enables opening movement of the gate end. As seen in FIG. 7, when gate 30 is locked, gate 30 has moved to the right and protrusion 26 nests firmly within undercut 36 thereby preventing opening movement of gate 30.

Reciprocating movement of gate 30 from the locked to the unlocked position, and the reverse, is provided by rotating eccentric 40. The dimensions of eccentric 40 are chosen to provide an appropriate distance "d" of arm 30 movement so that adequate opening clearance is provided in the unlocked position, and there is a solid and secure joining of the opening end of the gate to the body when in the locked position.

Advantageously the interlocking parts of the gate and body will fully engage just before eccentric 40 is rotated completely to the locked position. Early engagement will cause gate 30 to be pulled tightly against body 20, and put gate 30 in tension when the fully locked position of eccentric 40 is reached. Furthermore, the tension of engagement can be utilized to hold control arm 42 in the locked position by having eccentric 40 come to rest somewhat over-center.

The inventive carabiner is locked or unlocked by moving control arm 42. A single finger can be used to move control arm 42 in the approximately 180-degree arc centered on eccentric 40. As seen in FIG. 6, control arm 42 rests adjacent body 20 when the inventive locking mechanism is unlocked. As seen in FIG. 7, control arm 42 rests adjacent gate 30 when the inventive locking mechanism is locked.

Part of spring link 70 extends loosely down the center of spring 60, terminating at end 72. As seen in FIG. 6, when gate 30 is closed and unlocked, end 72 in hole 62 is located a short distance away from hole bottom 64, that distance being at least the distance "d" of FIG. 10. Locking movement of control arm 42 causes spring link 70 to compress spring 60, moving end 72 deeper into hole 62. Consequently, when completely locked end 72 is very close to or touching hole bottom 64 as shown in FIG. 7.

Figure 12:
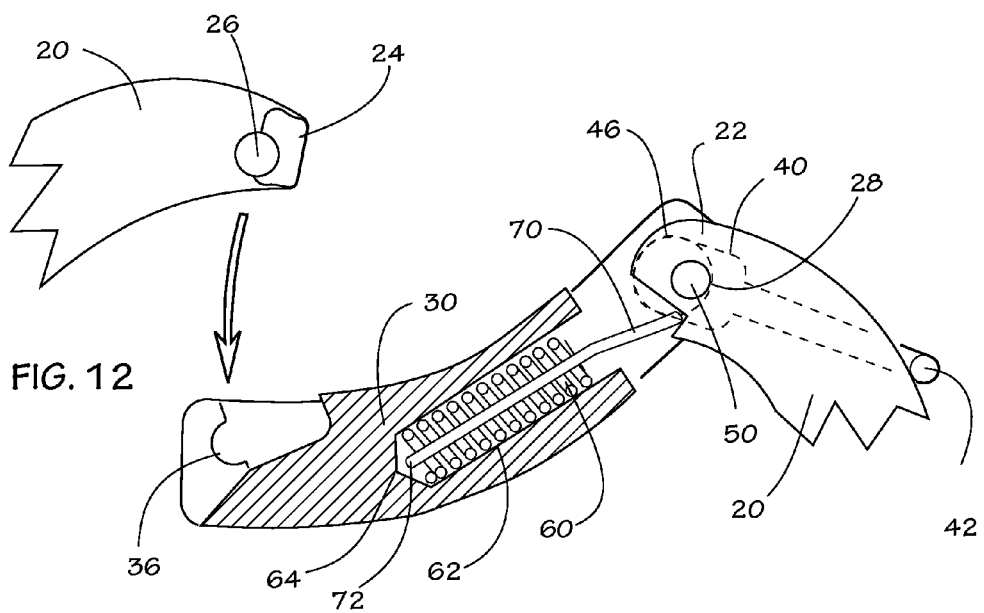
FIG. 12 is a partial close-up sectional view of the carabiner of FIG. 4 showing the gate unlocked and open.

Similarly, (referring to FIG. 12) opening movement (depicted by the outline arrow in FIG. 12) of unlocked gate 30 causes spring link 70 to compress spring 60, moving end 72 deeper into hole 62. When gate 30 is completely open, end 72 is very close to or touching hole bottom 64 as shown in FIG. 12. Consequently, when gate 30 is at least partially open, there will not be enough clearance between end 72 and bottom 64 to allow lever 42 to also be moved completely to the locked position because the additional movement of end 72 due to locking movement of lever 42 is blocked by hole bottom 64. This is a safety feature that prevents the carabiner from being inadvertently locked with the gate open.

Figure 11:
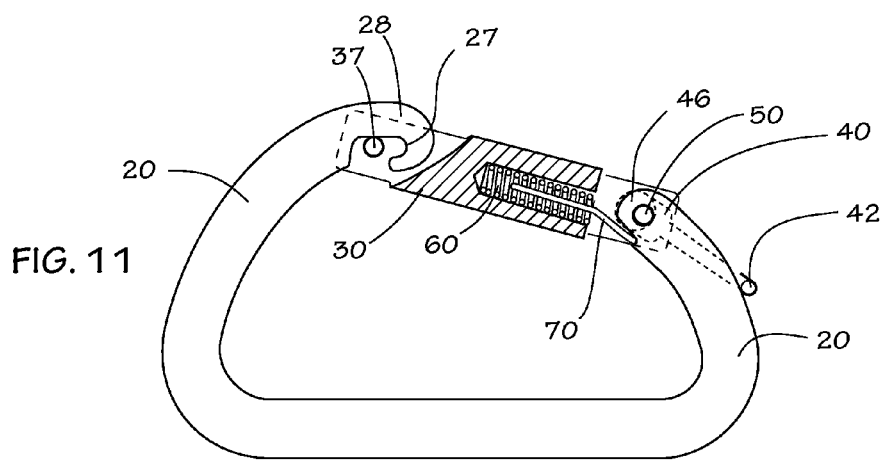
FIG. 11 is a side elevation view of a typical straight gate carabiner incorporating the inventive locking mechanism. The carabiner is pictured unlocked.

FIGS. 2-7 picture gate 30 as slightly bent at mid-length, however as seen as in FIG. 11, the inventive locking mechanism can be incorporated in carabiners having a solid straight gate. Furthermore, the keyed interlocking arrangement of FIGS. 2-7 can be replaced as shown in FIG. 11 with a pin and slot arrangement that interlocks the gate to the carabiner body when the gate is closed. The pin and slot arrangement of FIG. 11 serves the same locking and unlocking function as the key-shaped arrangement of FIGS. 2-7.

Referring to FIG. 11, the opening end of gate 30 includes pin 37 which transverses slot 34. When gate 30 is closed, pin 37 rests against the top of notch 27 in body 20, thereby limiting the closing movement of gate 30. The undercut of notch 27 also serves to capture pin 37 when high tensile loads deform body 20, or when the inventive carabiner gate is moved by the eccentric to the locked position. FIG. 11 pictures the carabiner unlocked. In the locked position pin 37 will be pulled firmly into the undercut of notch 27.

It is conceivable to change the location of control arm 42 with respect to the eccentric surfaces so that the inventive carabiner is locked when the control lever is adjacent body 20 as in FIG. 6. This reversed alternate configuration will function to lock and unlock the same as described for the preferred configuration. However, having control arm 42 adjacent the top of the locked gate as shown in the preferred configuration of FIGS. 2-7 is a safety feature because any outside forces working to inadvertently open the gate will additionally firmly hold control arm 42 in the locked position.

Figure 13:
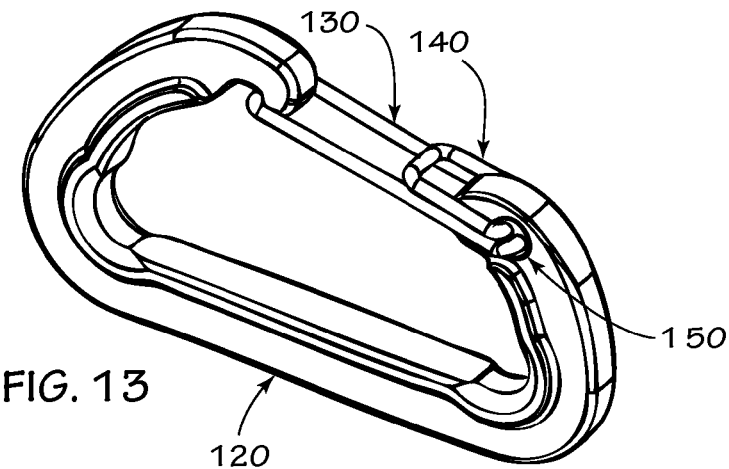
FIG. 13 is a isometric wireframe drawing of an inventive locking wire gate carabiner.
Figure 14:
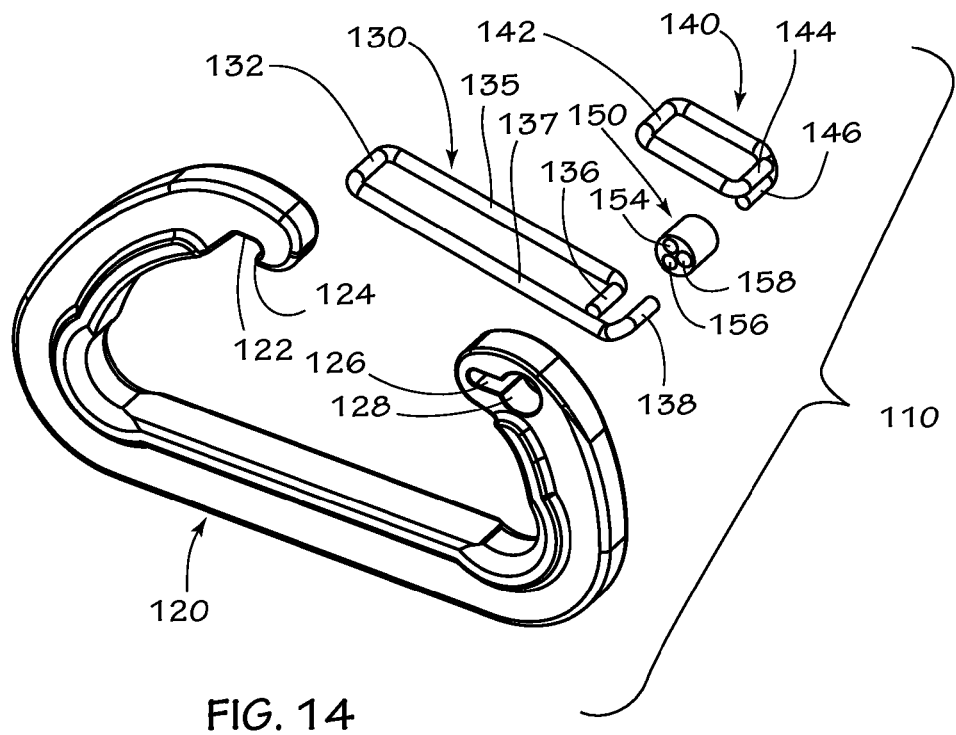
FIG. 14 is an exploded isometric wireframe drawing showing the components of the inventive carabiner of FIG. 13.

The instant invention can be applied to wire gate carabiners as well. FIG. 13 is a isometric wireframe drawing of an inventive locking wire gate carabiner. FIG. 14 is an exploded isometric wireframe drawing showing the components of the inventive carabiner of FIG. 13. The inventive wire gate carabiner comprises body 120, wire gate 130, control lever 140 and eccentric 150. Body 120 is typically fabricated from a lightweight, high strength material, for example heat treated aluminum alloy type 7075. Wire gate 130 is typically fabricated from spring wire, for example stainless type 302. Eccentric 150 is typically fabricated from a copper alloy, or other material of sufficient rigidity. Control lever 140 is typically fabricated from stainless spring wire.

Wire gate 130 is a loop of wire having nearly parallel unequal length legs 135 and 137 joined by looped end 132. Legs 135 and 137 have their staggered ends bent inward to form pivots 136 and 138 respectively.

One side of body 120 has hook-shaped notch 122 with overhanging lip 124. The other side of body 120 has a keyhole-shaped opening formed by hole 128 and channel 126. The width of channel 126 is slightly greater than the diameter of pivot 136 so that pivot 136 can easily slide along and rotate within the confines of channel 126. Channel 126 is needed because a wire gate has two separated pivots and only one of the pivots is controlled by the eccentric, the other pivot is guided by the channel to move in unison with the eccentric controlled pivot.

Control lever 140 is a short loop of wire having approximately equal length parallel legs with ends bent inward to form staggered parallel ends 144 and 146 opposite joining side 142.

Eccentric 150 is slightly smaller in diameter than hole 128 so that it can easily rotate within hole 128. Three holes 154, 156 and 158 are each drilled through the length of eccentric 150, parallel to its central axis. The diameter of hole 158 is slightly greater than the diameter of pivot 138 so that pivot 138 can easily rotate within hole 158. Movement of hole 158, which is offset relative to the central axis of eccentric 150, provides reciprocating motion when eccentric 150 is rotated. The diameters of holes 154 and 156 are sized to provide a tight fit for mounting wire ends 144 and 146, respectively, of control lever 140.

Figure 15:
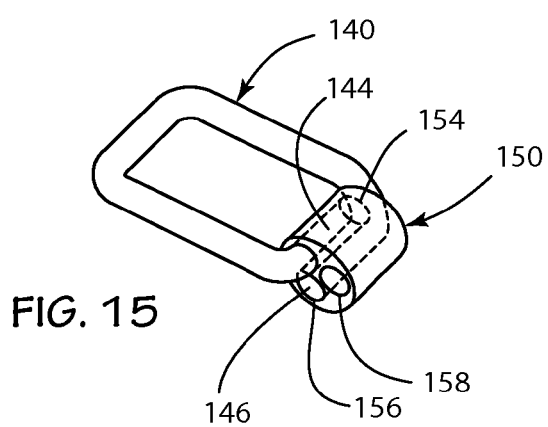
FIG. 15 is close-up isometric wireframe drawing of the locking eccentric of the inventive carabiner of FIG. 13.

FIG. 15 is an enlarged isometric wireframe drawing showing the assembly of control lever 140 and eccentric 150. Because staggered wire ends 144 and 146 are firmly fixed in parallel holes 154 and 156 respectively, movement of lever 140 causes a corresponding rotational movement of eccentric 150 in hole 128. The size and shape of control lever 140 is chosen for compactness and convenience of motion. Although control arm 140 is depicted as a simple U-shape formed wire, it can also be other shapes or constructions, for example a curved arm. Although a two piece assembly is shown, the same function can be achieved with a single part fabricated by machining, molding, forging, stamping and joining sheet-metal or wire, or-the-like. Similarly, the same locking function can be achieved with an assembly of more than two parts.

The assembly of lever 140 with eccentric 50, or its equivalent, is the locking mechanism of the inventive carabiner. Incorporating this locking mechanism on a wire gate carabiner adds insignificant weight and bulk to the carabiner. Similarly, Incorporating this locking mechanism on a rigid gate carabiner adds insignificant weight and bulk to the carabiner.

When the inventive carabiner is assembled, wire gate pivot 138 is located in hole 158 of eccentric 150. Wire gate pivot 136 is located in channel 126 adjacent hole 128 of body 120. The ends of pivots 136 and 138 are peened to secure them in place. Rotational movement of eccentric 150 causes back and forth movement of wire gate 130. Concurrently, pivot 136 slides back and forth in channel 126. Also concurrently, wire gate end 132 reciprocates within notch 122 toward or away from lip 124. When wire gate end 132 is pulled into the undercut of notch 122, lip 124 blocks opening movement of the wire gate. When wire gate end 132 is moved away and clear of lip 124, wire gate 130 is free to open.

The wire loop itself provides the closing force for wire gate 130. The wire loop must be slightly twisted for pivots 136 and 138 to pass respectively through channel 126 of body 120 and hole 158 of eccentric 150. Twisting the wire loop causes a cantilevered spring force that holds the gate normally closed. Opening the wire gate additionally twists the wire which increases the spring force working to close the gate.

The length of wire gate 130 is chosen so that when eccentric 150 is in the locked position, end 132 is pulled tight into the undercut of notch 122 and opening movement of wire gate 130 is blocked by protruding lip 124.

Advantageously, the length of wire gate 130 is slightly undersize so that when locked the engagement pulls against body 120, causing tension in wire gate 130. Furthermore, when locked, pivot hole 158 is rotated a small distance past over-center so that the wire gate tension serves to hold eccentric 150 in the locked position.

Referring to FIG. 16, to unlock wire gate 130, movement of control lever 140 in the direction depicted by the outline arrow "A" correspondingly rotates eccentric 150 which causes forward movement of wire gate 130 in the direction depicted by outline arrow "B". FIG. 17 shows lever 140 and eccentric 150 rotated approximately 180-degrees (with respect to the orientation depicted by FIG. 16) to the unlocked position.

To lock wire gate 130, movement of control lever 140 in the direction depicted by the outline arrow "C" in FIG. 17 correspondingly rotates eccentric 150 which causes backward movement of wire gate 130 in the direction depicted by outline arrow "D".

FIG. 18 shows a comparison of eccentric 150 in the locked and unlocked positions and shows the movement of hole 158 as a consequence of approximately 180-degree rotation of eccentric 150. Hole 158 is moved forward or backward the distance a-b depicted by the line with double arrows. The distance a-b must be sufficient to move wire gate end 132 into and out of engagement with lip 124.

Furthermore, as seen in FIG. 19, the length of channel 126 is chosen to accommodate the corresponding back and forth sliding movement a-b of pivot 136. When unlocked, pivot 136 is located in channel 126 at 136a. When locked, pivot 136 is located at 136b.

When wire gate 130 is closed but not locked, the interlocking relationship with hooked notch 122 serves to solidly join wire gate end 132 and body 120 when high tensile loads deform body 120, thereby enabling closed wire gate 130 to carry part of the load transmitted through body 120. Consequently, when the gate is closed the carabiner has the same strength whether locked or unlocked.

The inventive carabiner is locked or unlocked by moving control arm 140. As seen in FIG. 16, control arm 140 rests adjacent wire gate 130 when the inventive locking mechanism is locked. This is a safety feature because any outside force working to inadvertently push open the gate will also push and hold control arm 140 in the locked position. Conversely, as seen in FIG. 17, control arm 140 rests adjacent body 120 completely away from wire gate 130 when the inventive locking mechanism is unlocked, which enables wire gate 130 to be easily opened without interference.

Figure 20:
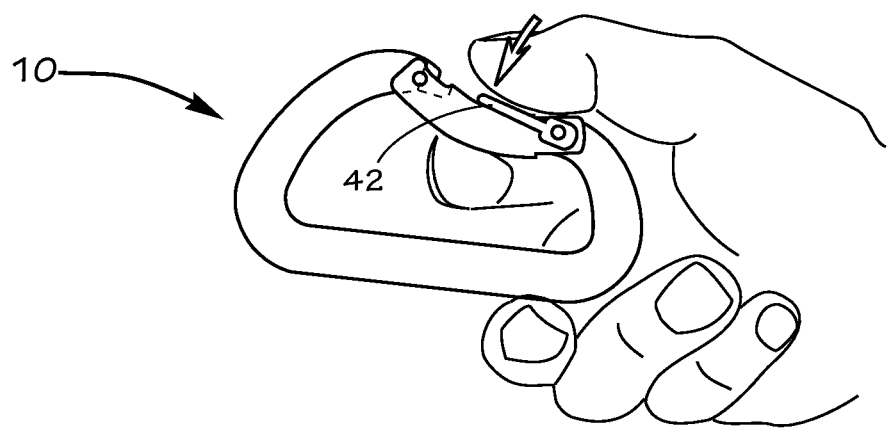
FIG. 20 is a pictorial view showing one hand manipulating the locking arm while holding the inventive carabiner.

Climbers are often in precarious positions in which only one hand is available to insert a rope into a carabiner (typically the other hand is occupied holding on to another climbing aid or the rock surface). Under such circumstances it is imperative that the carabiner be easily manipulated with one hand. Because the inventive locking carabiner has a control arm that can be easily locked with one finger; a climber can open and close gate 30 (or gate 130) as need, and when appropriate, lock the carabiner, all with the use of one hand. FIG. 20 illustrates one of the many ways the inventive carabiner can be held and locked with one hand.

Figure 21:
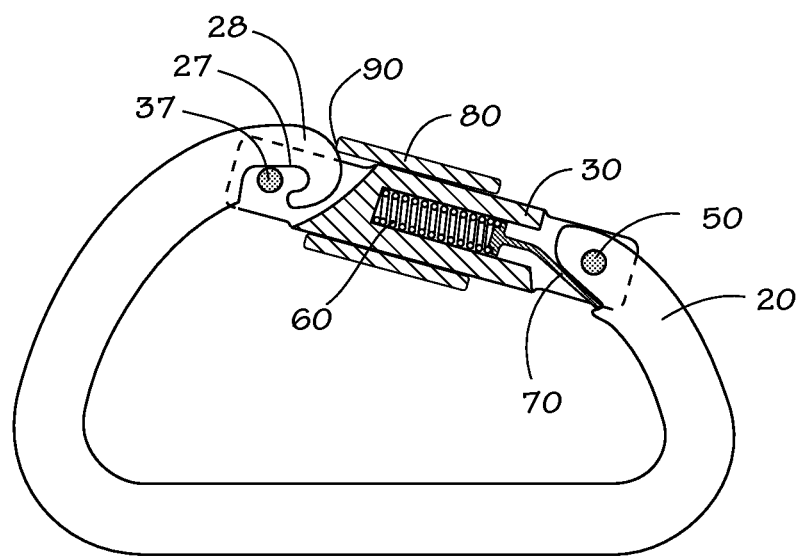
FIG. 21 is a partial sectional view of a typical Prior Art locking carabiner.

FIG. 21 is a partial cross section of a typical prior art locking carabiner. Sleeve 80 is threaded nut-like to gate 30 and can be screwed along the length of gate 30 either toward or away from leg end 28 of body 20. FIG. 21 pictures sleeve 80 in the locked position against nose 90 of leg end 28, thereby immobilizing gate 30.

The prior art configuration illustrated by FIG. 21 is considered by climbers to be the "gold standard" of locked security and is the preferred configuration for attaching climbing rope, rappelling and belay equipment and-the-like to the climber's body harness. However the locking carabiner of FIG. 21 is not suitable for quickdraw use due to its weight and bulk and the possibility that the gate may be locked or will lock when a climber is trying to clip a rope. Furthermore, the locking sleeve of FIG. 21 will not work on a bent gate carabiner or a wire gate carabiner.

Other variations on the shape and/or relative locations of the carabiner body, gate, or eccentric mechanism are contemplated. For example, gate slot 32 can be widened to accommodate the placement of control arm 42 within slot 32 of gate 30 instead of outside.

It is understood that those skilled in the art may conceive of other modifications and/or changes to the invention described above. Any such modifications or changes that fall within the purview of the description are intended to be included therein as well. This description is intended to be illustrative and is not intended to be limitative. The scope of the invention is limited only by the scope of the claims appended hereto.

What I claim is:

1. A locking carabiner, comprising:
   a carabiner body comprising:
      a first body leg end; and
      a second body leg end;
      wherein a gap separates the first body leg end and the second body leg end;
   a gate comprising:
      an opening end; and
      a hinged end;
   a locking mechanism comprising:
      an eccentric having an offset hole, where the eccentric is configured to rotate with respect to a hole in the second body leg end; and
      a control arm connected to the eccentric and configured to control rotation of the eccentric between an unlocked position and a locked position;
   wherein the hinged end of the gate is pinned through the offset hole in the eccentric to pivotally attach the hinged end of the gate to the second body leg end;
   wherein the gate spans the gap separating the first and second body leg ends of the carabiner body and is configured to pivot away from the first body leg end when the eccentric is in the unlocked position; and
   wherein rotation of the eccentric from the unlocked position to the locked position pulls the gate toward the second body leg end so that the opening end of the gate forms an interlocking relationship with the first body leg end in which the gate cannot pivot away from the first body leg end.

2. The locking carabiner of claim 1, wherein:
   the eccentric is contained within the hole in the second body leg end;
   the gate is a wire gate constructed from a loop of wire having unequal length legs joined by a looped end, where the ends of the unequal length legs are bent;
   the bent end of a first of the unequal length legs is pinned to the offset hole in the eccentric;
   the bent end of a second of the unequal length legs of the wire gate is configured to slide within a channel in the second body leg end; and
   the first body leg end includes a hooked notch that forms an interlocking relationship with the looped end of the wire gate when the eccentric is in the locked position.

3. The locking carabiner of claim 2, wherein the channel in the second body leg end connects to the hole in the second body leg end.

4. The locking carabiner of claim 2, wherein the eccentric has second and third offset holes and the control arm is constructed from a loop of wire having legs joined by a looped end, where the ends of the control arm's legs are bent and pinned to the second and third offset holes in the eccentric.

5. The locking carabiner of claim 1, wherein the control arm fits adjacent the gate when in the locked position.

6. The locking carabiner of claim 5, wherein the control arm is sheet-metal folded around the exterior of the gate when in the locked position.

7. The locking carabiner of claim 5, wherein the control arm is constructed from a loop of wire having legs joined by a looped end.

8. The locking carabiner in claim 1, wherein:
   the eccentric is pivotally mounted to the second body leg end by a pin that passes through the offset hole in the eccentric and the hole in the second body leg end; the gate is a solid gate that further comprises a blind hole that contains a spring assembly that engages against the bottom of the blind hole; the second body leg end also comprises a notch; and
   the spring assembly engages the second body leg end notch which urges the solid gate to pivot toward the first body leg end.

9. The locking carabiner of claim 8, where the spring assembly comprises a spring and a spring link, the spring link having an end inside the blind hole configured to substantially make contact with the blind hole bottom when the gate is fully open thereby preventing the control arm from moving from the unlocked position to the locked position when the gate is at least partially open.

10. The locking carabiner of claim 8, wherein the first body leg end includes a hooked notch that forms an interlocking relationship with a pin in the opening end of the solid gate when the eccentric is in the locked position.

11. The locking carabiner of claim 8, wherein the opening end of the solid gate includes a hooked notch that forms an interlocking relationship with a pin in the first body leg end when the eccentric is in the locked position.

12. The locking carabiner of claim 8, wherein the solid gate is a bent gate.

13. The locking carabiner of claim 8, wherein the solid gate is a straight gate.

* * * * *